Dec. 8, 1964  C. J. HILL  3,159,872
POULTRY GIZZARD PROCESSING METHOD
Filed July 22, 1963  6 Sheets-Sheet 1

Fig. 1.

INVENTOR.
Carl J. Hill
BY
Darbo, Robertson & Vandenburgh
Attys.

Dec. 8, 1964 — C. J. HILL — 3,159,872
POULTRY GIZZARD PROCESSING METHOD
Filed July 22, 1963 — 6 Sheets-Sheet 2

INVENTOR.
Carl J. Hill
BY Darbo, Robertson & Vandenburgh
Attys.

Dec. 8, 1964   C. J. HILL   3,159,872
POULTRY GIZZARD PROCESSING METHOD
Filed July 22, 1963   6 Sheets-Sheet 3

INVENTOR.
Carl J. Hill
BY Darbo, Robertson &
Vandenburgh
Attys.

Dec. 8, 1964

C. J. HILL 3,159,872

POULTRY GIZZARD PROCESSING METHOD

Filed July 22, 1963

INVENTOR.
Carl J. Hill
BY
Darbo, Robertson &
Vandenburgh
Attys.

United States Patent Office 3,159,872
Patented Dec. 8, 1964

3,159,872
POULTRY GIZZARD PROCESSING METHOD
Carl J. Hill, Box 409, Canton, Ga.
Filed July 22, 1963, Ser. No. 298,521
9 Claims. (Cl. 17—45)

The present invention relates to improvements in the methods and apparatus for processing poultry gizzards, and the following disclosure is offered for public dissemination upon the grant of a patent therefor.

The present application is a continuation-in-part of my prior application Serial No. 190,166, filed April 25, 1962, now abandoned.

In processing poultry gizzards before they are sold to the consumer or otherwise prepared for consumption, the gizzard must be slit open, the contents of the internal pocket therein removed and the membrane lining the walls about the internal pocket detached from the remainder of the gizzard. Machines are available for performing the operations of opening the gizzard, cleaning the interior thereof and removing the membrane lining. Insofar as I am aware, all of the available machines require a hand loading operation.

One of the principal reasons that has necessitated the hand loading of the machines for slitting and washing the gizzards is that the orientation of the slit made through the gizzard to open it for washing and peeling preferably is made in a particular orientation with respect to the gizzard. In general the shape of the internal pocket is not regular. That is, in the main the gizzard pocket has relatively large dimensions along two of its axes and a relatively small dimension along a third axis. Preferably, the cut made in opening the gizzard is made transversely to the smallest axis. To load the gizzards into a conventional machine requires human judgment to position the gizzard in the machine so that the slit to open the gizzard will be cut normal to this smallest axis of the pocket.

It is a principal object of the method that I have devised to achieve an orientation of the gizzard to permit the gizzard to be loaded into machines without the necessity of utilizing the human senses to achieve the desired orientation of the gizzard in the holders. While my invention may be employed in the manual loading of gizzards into conventional processing equipment, its greatest advantage is achieved in enabling the gizzards to be loaded by automatic machinery without the necessity of using hand labor. To the extent that hand labor is eliminated, a substantial saving in processing costs can be achieved.

A further principal object of my invention is to detach the gizzard from the poultry carcass in a manner in which an initial orientation is achieved from the position of the stomach with respect to the gizzard at the carcass. The initial orientation enables detaching apparatus to deliver the two to the slitter and washer in a particular orientation. The method is such that I have been successful in devising apparatus in which the automatic processing commences with the detachment step. Thereafter the gizzard is moved to the slitter and washer in a predetermined orientation and loaded into that machine in a position such that the gizzard is properly oriented with respect to the cut that will be made through it by the machine. The method of the present invention has been an important factor in the improvement of apparatus for processing poultry gizzards. For example, improved lining removal apparatus has resulted from the fact that the gizzards had the stomachs attached to be employed for the proper positioning of the gizzards on the peeling rolls of the lining removal apparatus.

Further objects and advantages will be apparent from the following description taken in conjunction with the drawings in which.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts; improvements, or combinations in which the inventive concepts are found.

In the method of my invention the gizzard is not separated from the stomach when the two are removed from the poultry carcass. This is contrary to the conventional commercial practices known to me. During the eviscerating process of the poultry carcass the intestine is cut from the gizzard and the gut (gullet) is cut from the stomach. After this operation is performed the gizzard and the stomach remain connected together by a small tube.

In actual practice the eviscerating will take place while the carcass still is hanging from a shackle moving along with an overhead conveyor. The shackle preferably is of the three-point suspension type. The evisceration is carried out to the point that the gizzard has been separated from the intestine and the intestine removed. The gizzard and stomach then are left in a position such that they are hanging from the carcass cavity by the gut. At a given point along the path of movement of the carcass the shackle is aligned to facilitate cutting the gut and moving the gizzard and its attached stomach to the slitter and washer. After alignment, the gut is severed to release the stomach and gizzard. These two then are moved in a given sequence to the position at which the gizzard is to be received by the holders of the slitting machine. The portions, stomach and connecting tube, that remain attached to the gizzard are used to align the gizzard in the holders in a manner such that, as the gizzard holders move past the slitting knife, the gizzard will have the desired orientation for producing the proper line of cut through the gizzard. In one embodiment the portions attached to the gizzard are grasped and used to manipulate the gizzard into the desired position in the holders.

I have found it facilitates the carrying out of my process if the gizzard and stomach are moved to the slitting machine along a path in sequential order in which the stomach precedes the gizzard. The final positioning of the gizzard in the slitting machine is accomplished by an engagement of the attached portions and a movement of the gizzard directed by that engagement. The method I have devised may be practiced in a manner such that the stomach is detached from the gizzard after it has been utilized to position the gizzard in the slitter and also in a manner in which the stomach is retained in place until after it is employed to position the gizzard on the lining removal apparatus.

The drawings illustrate an embodiment of an apparatus for carrying out the method heretofore explained. As is conventional in the industry, the partially processed poultry 14 is carried by a shackle 15. The shackles are supported and moved in the direction indicated by arrow 16 by an overhead conveyor generally 17. The specific structure of the overhead conveyor 17 is unimportant to the present invention. Shackles 15 are of the three-point suspension type in which the legs 18 and the neck 19 of the poultry all are engaged in the shackle. The poultry already have been partially processed, including partial evisceration, and the gizzard 20 and the stomach 21 are hanging from the poultry 14 by the gut 22. The gizzard 20 and stomach 21 are connected by a small tube 23.

The apparatus embodying my invention includes a frame generally 25. A worm 26 is journaled in a bearing 27 mounted on frame 25. Worm 26 is rotated by a power means such as motor 28 connected to the worm through a flexible shaft 29 and a coupling 30. The worm is rotated in the direction indicated by arrow 31.

Worm 26 has an unsupported end defined by conical cap 33. The axis of the worm from the supported end, as defined by bearing 27, to the unsupported end extends generally in the reverse of the direction of movement of the poultry, indicated by arrow 16. In addition to extending generally in the reverse of the path of movement of the poultry, the worm extends slightly downwardly (from the supported to the unsupported end) to automatically adjust for poultry of different sizes. The poultry are aligned by means such as bar 34 which contacts shackle 15 (in conjunction with the alignment provided by the path of travel of the conveyor).

Figures 2, 3, 4:
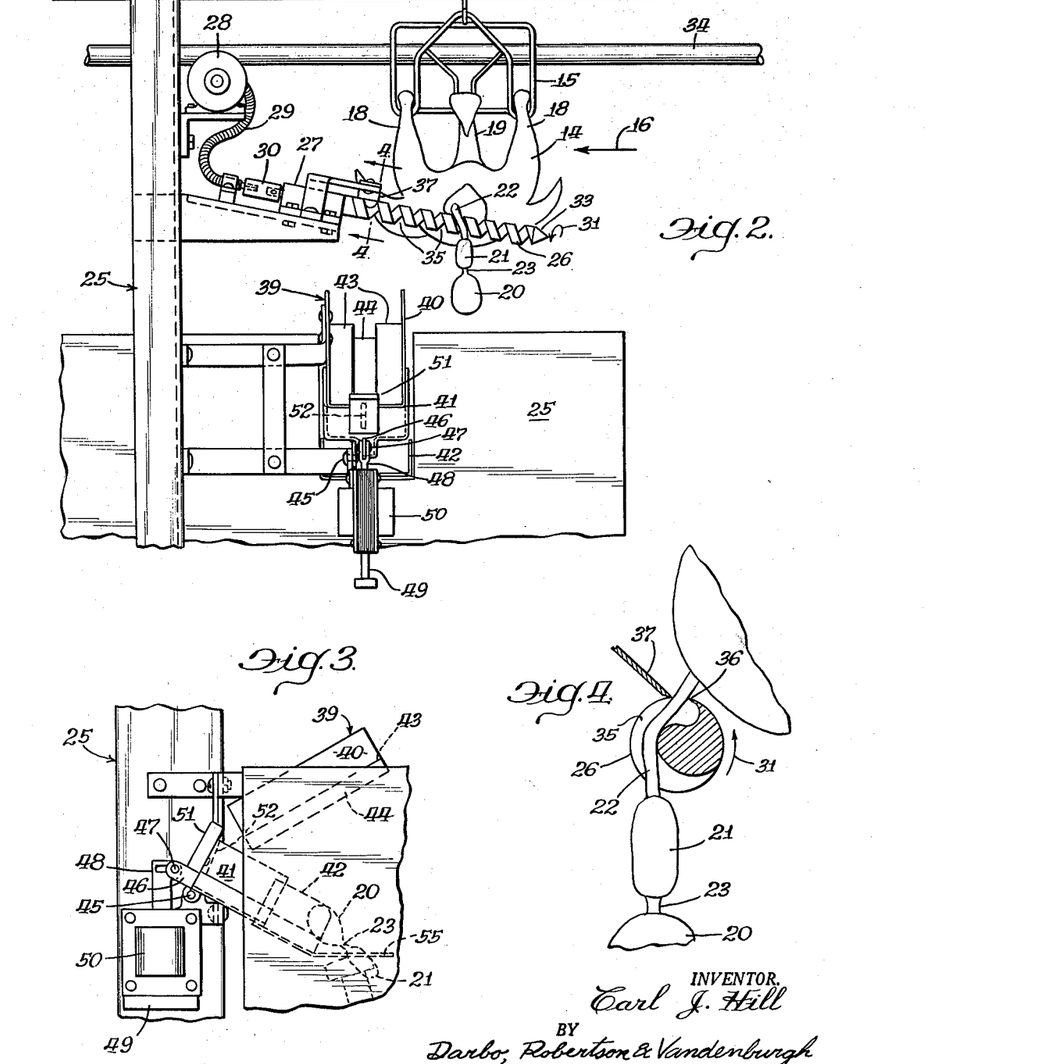
FIGURE 2 is a partial elevation as viewed at line 2—2 of FIGURE 1.
FIGURE 3 is a partial elevation as viewed in FIGURE 1 showing the transfer chute in an alternate position.
FIGURE 4 is an enlarged section through the worm and cutter for the gut as seen at line 4—4 of FIGURE 2.
Figure 5:
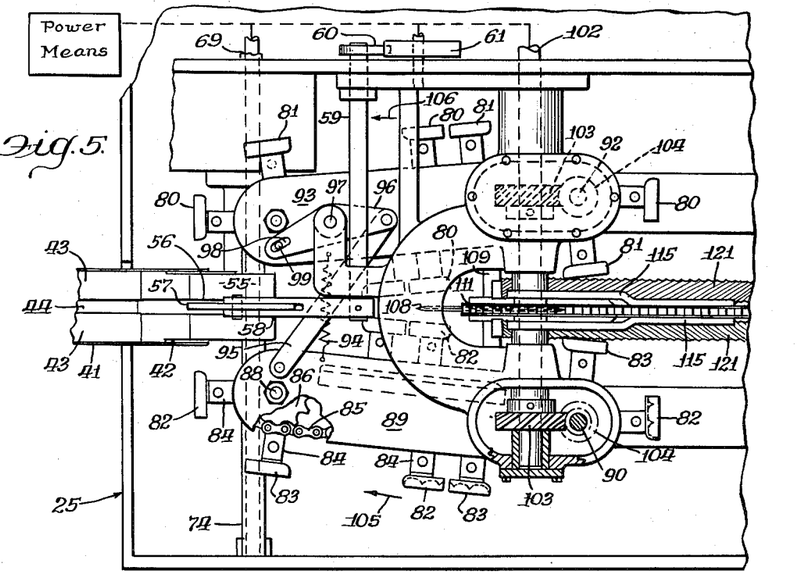
FIGURE 5 is a partial plan view showing the portion of the apparatus for receiving and grasping the detached gizzards.

The worm is positioned so that cap 33 will pass between the carcass of the poultry and the stomach 21. Thus, gut 22 will become engaged in the helical opening 35 on worm 26. The rotation of the worm will move gut 22 in the same direction, i.e. the direction of arrow 16, that the poultry carcass is moving. Immediately adjacent the supported end of the worm the helical opening 35 terminates in a cutter 36 which has a cutting edge coincident with the periphery of worm 26. A fixed cutter blade 37 is mounted on frame 25 and has a cutter edge at the periphery of the worm and extending parallel to the axis of the worm. As the tube 22 reaches this portion of the worm it is clipped between the two cutters 36 and 37 as best illustrated in FIGURE 4.

The detached stomach and gizzard fall into a conveyor defined by a chute generally 39. Chute 39 has three portions, an upper fixed portion 40, a middle pivoted portion 41, and a lower fixed portion 42. Chute 39 has a pair of spaced ledges 43 at each side of a center groove 44. Ledges 43 are sufficiently close together so that a gizzard will be supported thereon. At the same time they are sufficiently far apart so that the stomach will slide within groove 44.

Figure 1:
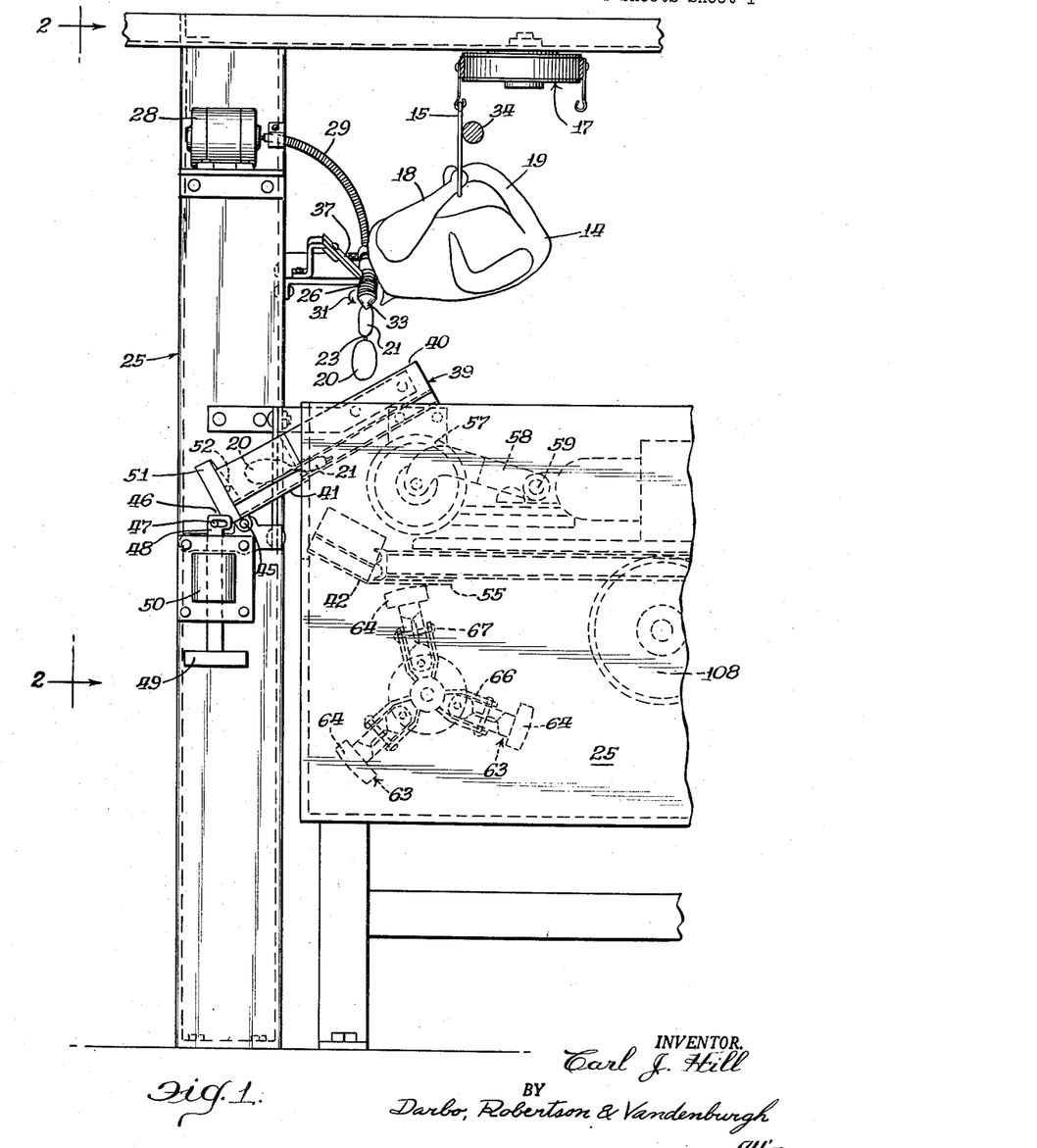
FIGURE 1 is an elevational view of an embodiment of my invention.

Portion 41 of the chute is pivotally supported on frame 25 at 45. A lever arm 46 extends rearwardly of portion 41 and is connected by a pin 47 to a plunger 48. Plunger 48 is secured to an armature 49 of a solenoid 50. On portion 41 is an electrical switch 51 having a switch actuating member 52 facing upwardly in the chute. (See FIGURE 1.).

When the gizzard and stomach are detached from the carcass they initially fall into portion 40 of chute 39. At this time the gizzard 20 will be downwardly, ahead of the stomach 21, as they move down the chute. After they have slid approximately to the position indicated in FIG.1, gizzard 20 will contact actuating member 52 to actuate switch 51 and energize solenoid 50. Solenoid 50 will then pick up armature 49 moving it to the position illustrated in FIGURE 3. Plunger 48 will pivot portion 41 of the chute to the position illustrated in that figure. The gizzard and the stomach then will slide downwardly into portion 42 of the chute but at this time the stomach 21 will be ahead of the gizzard 20.

It will be apparent to those skilled in the art that a hydraulic or a pneumatic actuating means might be used to pivot portion 41 of the chute, rather than a solenoid and armature as illustrated. Timing means, not shown, will be employed to de-energize solenoid 50, a given period of time after it has been energized. The period of time selected will be sufficient time for the stomach and gizzard to have moved into the fixed portion 42 of the chute. When solenoid 50 is de-energized, the weight of armature 49 and plunger 48 will return the pivoted portion 41 of the chute to the position illustrated in FIGURE 1.

At the lower end of chute portion 42 is a generally horizontal plate 55 having a slot 56 extending the length thereof in line with groove 44 in the chute. Stomach 21, preceding gizzard 20 down the chute, will fall through slot 56. However, a stop defined by wheel 57 blocks the movement of gizzard 20. Wheel 57 is rotatably mounted on an arm 58. Arm 58 is secured to a shaft 59 suitably journaled in frame 25. A cam follower 60 is secured to shaft 59. A cam 61, upon which follower 60 rides, periodically pivots arm 58 a limited amount in a clockwise direction as viewed in FIGURES 1 and 6. Thus, at timed intervals stop wheel 57 is raised to permit gizzard 20 to continue on down chute portion 42 and onto plate 55. Subsequently stop wheel 57 again is lowered.

Figure 6:
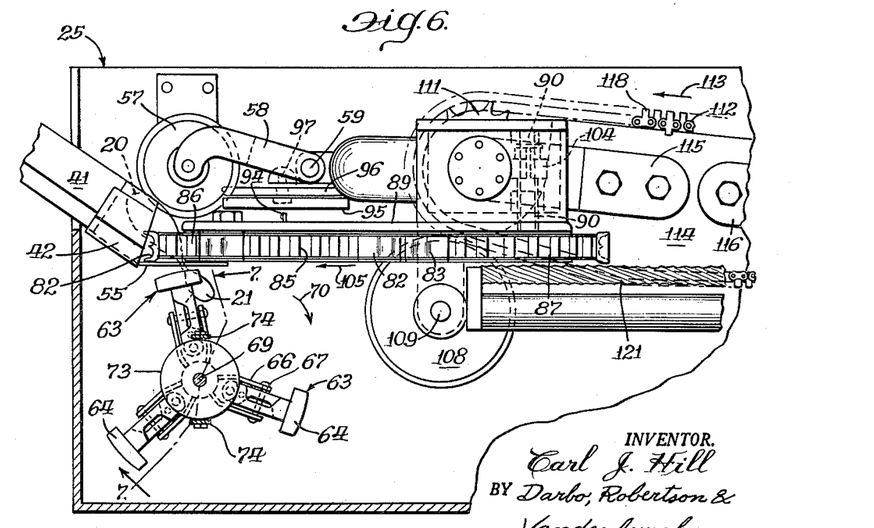
FIGURE 6 is a sectional elevational view of the apparatus of FIGURE 5.

In a corresponding timed relationship one of the portions dangling from the gizzard, e.g. the stomach 21 and tube 23, is grasped by one of the grippers generally 63 and pulled to the right and downwardly as viewed in FIGURE 6. This aligns the gizzard in a predetermined position on plate 55 where the gizzard is grasped by holders as hereinafter described. With the gizzards supported on plate 55 and grasped by the holders, continued movement of gripper 63 applies sufficient tension to tube 23 to break the tube and separate the stomach 21 from the gizzard 20.

Figure 7:
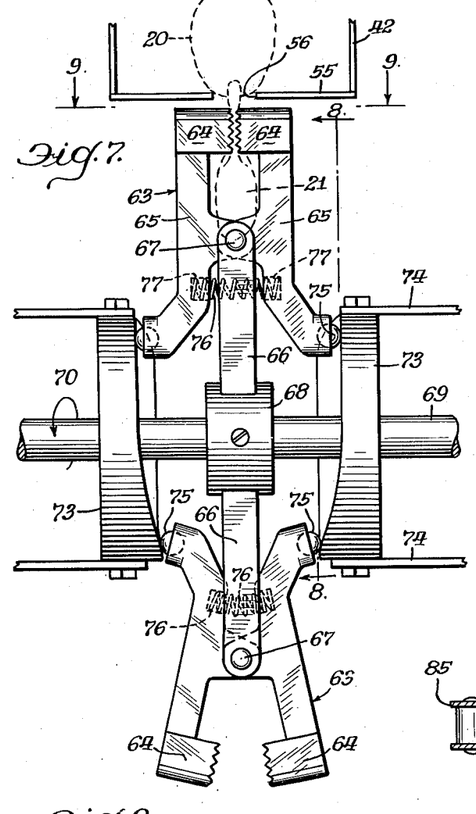
FIGURE 7 is an enlarged partial section as viewed at line 7—7 of FIGURE 6.
Figure 8:
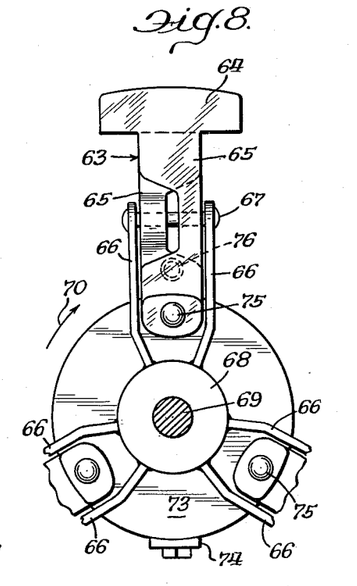
FIGURE 8 is a partial section as viewed at line 8—8 of FIGURE 7.
Figure 9:
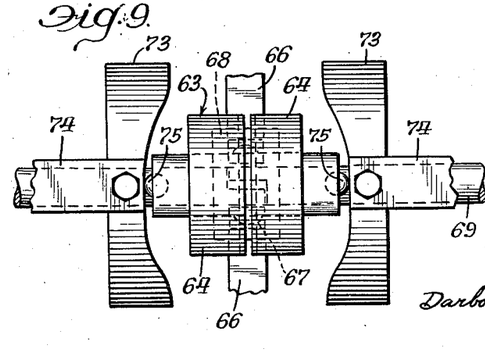
FIGURE 9 is a partial plan view as viewed at line 9—9 of FIGURE 7.

Grippers 63 are best illustrated in FIGURES 7-9. They are comprised of a pair of jaws 64 mounted on arms 65. Arms 65 are pivotally secured to brackets 66 by pins 67. Brackets 66 are secured to a hub 68 which in turn is affixed to a shaft 69. Shaft 69 is suitably journaled in frame 25. It is connected to a suitable power means to rotate grippers 63 in the direction indicated by arrow 70.

A pair of cams 73 are journaled on shaft 69 and are held in position by brackets 74 forming a part of frame 25. Captive balls 75 on the inner ends of arms 65 ride on the faces of cams 73 and serve as cam followers. Springs 76, the ends of which are received in recesses 77 in arm 65, urge balls 75 against the faces of the cams. At the same time, of course, springs 76 urge jaws 64 toward each other.

Cams 73 are shaped so that the jaws 64 of gripper 63 are open from about the five o'clock position to about the twelve o'clock position as viewed in FIGURE 6. From about the twelve o'clock position to about the five o'clock position the grippers are closed by the urging of springs 76. Thus as the uppermost gripper passes the dangling stomach 21 in FIGURE 6, the gripper is closed to grasp the stomach 21, the tube 23, or portions of both. After the stomach has been separated from the gizzard, it is dropped by the cam actuated opening of the gripper 63.

In the meantime the gizzard 20 will have been engaged by holders as hereinafter described. In the illustrated embodiment there are opposed pairs of holders 80 and 81, and 82 and 83. Holders 82 and 83 are secured to arms 84 attached to a roller chain 85. Chain 85 is supported by a pair of sprockets 86 and 87. Sprocket 86 is journaled on a stub shaft 88 on the outstanding end of mounting member 89. Sprocket 87 is secured to a driven shaft 90. Mounting member 89 is journaled on shaft 90.

Holders 80 and 81 are similarly mounted on a chain, not shown. One of the sprockets for this second chain is secured to shaft 92. The other is on the outstanding end of mounting member 93 which also is journaled on shaft 92. Mounting members 89 and 93 are urged towards each other by a spring 94. They are caused to move in unison by the connection of links 95 and 96. One end of link 95 is pivotally connected to mounting member 89 and the other end is pivotally connected to one end of link 96. Link 96 is pivotally attached to frame 25 by a pin 97 at about the center of the link. The other end of link 96 has a slot 98, within which is received a pin 99 secured to mounting member 93.

A shaft 102 is journaled in frame 25 and is driven by the power means. It carries a pair of gears 103 which drive gears 104 secured to shafts 90 and 92 respectively. The direction of drive is such that holders 82 and 83 move in the direction indicated by arrow 105 while holders 80 and 81 move in the direction indicated by arrow 106. The pairs of holders separate as arms 84 move about the sprockets, while along the straight runs between the sprockets, the holders are in juxtaposition.

Figure 10:
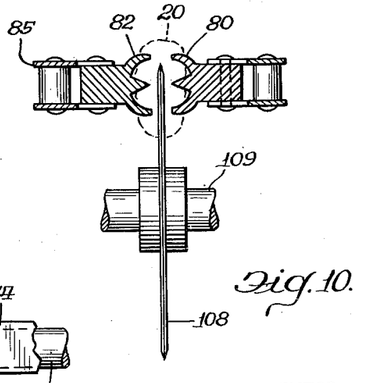
FIGURE 10 is a partial section illustrating the gizzard holders and the gizzard slitting knife.

As best seen in FIGURE 6 the holders 80–83 move in a generally horizontal plane immediately above the top of plate 55. As the holders approach each other they grasp the gizzard approximately as illustrated in FIGURE 10. With gizzards of a normal size, the gizzard will be thicker than the free space between the opposed holders, e.g. holders 80 and 82. Mounting members 89 and 93 thereby will be pushed apart against the resistance of spring 94.

The gizzard so grasped is moved by the holders past a rotary slitting knife 108 secured to a shaft 109. Shaft 109 is suitably journaled in frame 25 and is connected to the power means to be rotated thereby.

A sprocket 111 is secured to shaft 102. Sprocket 111 drives a chain 112 in the direction indicated by arrow 113. An idler sprocket, not shown, supports the other end of chain 112. Between the two sprockets chain 112 rides on a guide plate 114. Guide plate 114 is secured to a pair of arms 115. A second pair of arms 116 supports guide plate 114 from the other shaft on which the opposite sprocket, not shown, is mounted. As best seen in FIGURE 6 chain 112 moves about sprocket 111 down over the top of the gizzards in the holders so that projections 118 on chain 112 contact the top of the gizzards. At about this stage holders 80–83 move apart sufficiently to release the slit gizzard. The gizzard is dropped on a pair of cleaning rolls 121 suitably journaled in frame 25. Rolls 121 are connected to the power means to be rotated in a direction such that the tops of the rolls are moving away from each other. This acts to spread the split gizzard which is moved along the cleaning rolls by projections 118 of chain 112.

FIGURES 11–15 illustrates an alternative form of a slitting and washing machine and one which includes a gizzard lining removal apparatus. In this embodiment the gizzard lining removing apparatus is unique in that the presence of the stomach, attached to the gizzard, is employed to properly position the gizzard with respect to the peeling rolls and to accurately and promptly initiate the peeling operation. The apparatus has the feature that after such positioning and aligning, the stomach is automatically detached from the gizzard. The gizzards to be processed are delivered to the embodiment of FIGURES 11–15 by the lower section 42 of the chute.

This embodiment includes a frame 125 on which is the conveyor 126. The conveyor 126 is defined by a chain 127 trained for movement about two sprockets 128 and 129. While in some embodiments chains 126 will provide sufficient engagement with the gizzard and stomach, I prefer to employ a plurality of projections 130 which extend up from the side links of the chain as an additional engaging means. Sprocket 128 is mounted on a shaft 131 suitably journaled in frame 125. Sprocket 129 is secured to a shaft 132 journaled in bearings 133 and 134 of frame 125.

A second sprocket 136 is secured to shaft 132 and is driven by a chain 137 from sprocket 138 on the output shaft 139 of a speed reducer 140. The input shaft 141 of the speed reducer has a pulley 142 secured thereto. Pulley 142 is driven by a belt 143 from a pulley 144 on shaft 145 of electric motor 146.

Motor 146 is secured to brackets 148 and 149 slidably mounted on posts 150 of frame 125. A screw 151 operated by hand wheel 152 and journaled in frame 125 is threadably engaged with bracket 149 to enable the operator to adjust the vertical position of motor 146 and thus knife 153. Knife 153 is secured to a shaft extension 154 which in turn is attached to motor shaft 145.

A feed trough 156 connects with lower chute 42. Like chute 42, trough 156 has a central groove 157 and side ledges 158. At each side of trough 156 are water pipes 159 which are open at the ends most adjacent conveyor 126. Pipes 159 are spaced sufficiently far apart so that the gizzards will pass freely therebetween. Pipes 159 are connected together by a pipe 160 which in turn connects with a suitable source of water supply, not shown. Also connected to pipe 160 is a pipe 161 which definies an opening 162 at the low end of groove 44 and directed down groove 157 of feed trough 156.

Immediately ahead of conveyor 126, as related to the direction of movement of the gizzards into the machine, is a hold-down or gate 164. Gate 164 has a pair of stub shafts 165 which are journaled in slots 166 of brackets 167 forming a part of frame 125. Gate 164 has a nose 168 that projects forward and is just slightly wider than groove 157. It will be apparent that gate 164, with its pivotal support at only one end, is urged downwardly by the weight thereof.

Saw 153 has a cutting edge 153a and a plurality of radial cutting notches 153b. Even though edge 153a may be relatively sharp in the initial stages of the operation of the machine, it will become dulled through use. This causes no difficulty however, since the major cutting function is performed at notches 153b. Knife 153 is rotated in the direction indicated by arrow 155.

Following the cutting by knife 153, the gizzards 20 are moved by conveyor 126 through a cleaning and washing zone. A hold-down bar 170 extends above and generally parallel to the top run of chain 127. It has a bifurcated nose 171 which extends about blade 153 and a curved tail piece 172 that substantially conforms to the curvature of chain 127 about sprocket 129. A pair of wings 173 are secured to bar 170 and extend outwardly and downwardly from a forward position thereof.

Bar 170 is affixed to the under side of spray pipe 175 supplied with water from a suitable source, not shown, through a supply pipe 176. Spray pipe 175 has a plurality of spray orifices 177 extending therealong and at opposite sides of bar 170. Pipe 175, and thus in turn bar 170, is supported from frame 125 by brackets 178 suitably secured to the frame and to spray pipe 175. Guide plates 180 are secured to frame 125 and are positioned at sprocket 129, at opposite sides of the sprocket and at opposite sides of chain 127.

The gizzard liner removal means is mounted at the end of conveyor 126 and comprises two helically ribbed peeling rolls 182 and 183 suitably journaled in frame 125. The helical ribs have a substantial pitch, approximately four times the external diameter of the rolls. Roll 182 has a shaft 183 which is connected by a coupling 184 to shaft 185 of electric motor 186. The interengagement of the helical ribs of the two rolls causes roll 182 to in turn drive roll 183. The rolls are rotated in a direction such that gizzards deposited thereon are moved by the helical ribs and the engagement with the rolls in the direction indicated by arrow 187 in FIGURE 14.

At the entering end of rolls 182 and 183, the external diameter of the ribs is reduced in size whereby the periphery of the ribs of the two rolls define a slot 188 therebetween. A pair of ribbed cleaning rolls 189 are suitably journaled in frame 125 and interengage the peeling rolls 182 and 183 at the entering end thereof. A cover plate 191 is positioned over peeling rolls 182 and 183 and has an opening 192 aligned with the line of interengagement between the two rolls. At the discharge end, opening 192 narrows to a small opening 193.

As previously described, the stomachs 21 come down chute 42 followed by the gizzards 20. At the end of the chute the water jets from opening 162 and from the openings in the ends of pipes 159 push the two along feed trough 156 to a position against gate 164 and into contact with saw or knife 153. Actually the stomach is permitted to move under the nose 168 of gate 164 through the opening provided between it and the bottom of groove 157.

Figures 11, 12, 13:
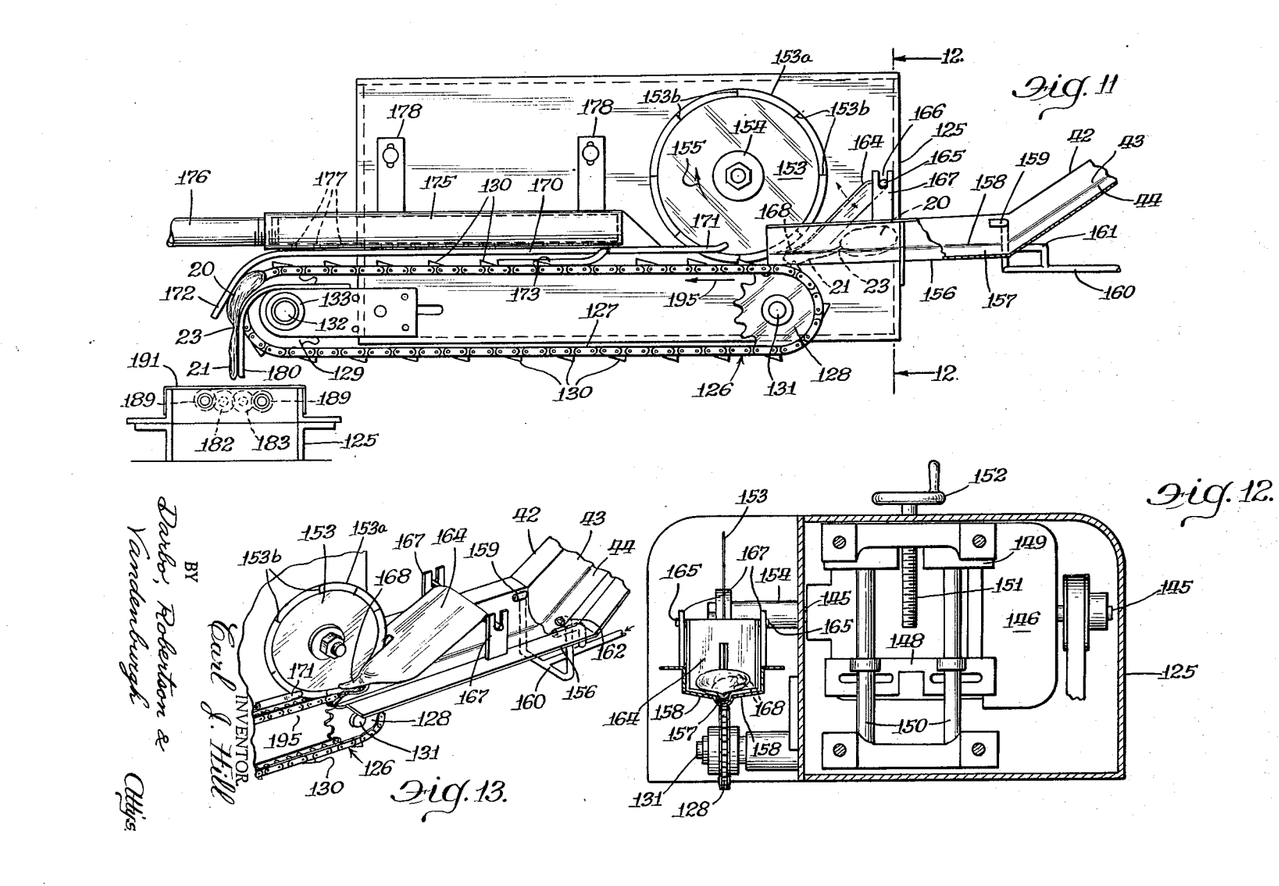
FIGURE 11 is an elevational view, partially in section and partially broken away, of an alternative form of cleaning and washing apparatus embodying a lining removal means.
FIGURE 12 is an enlarged section as seen at line 12—12 of FIGURE 11.
FIGURE 13 is a perspective view of the cutting knife and feeding means of the embodiment of FIGURE 11.
Figures 14, 15:
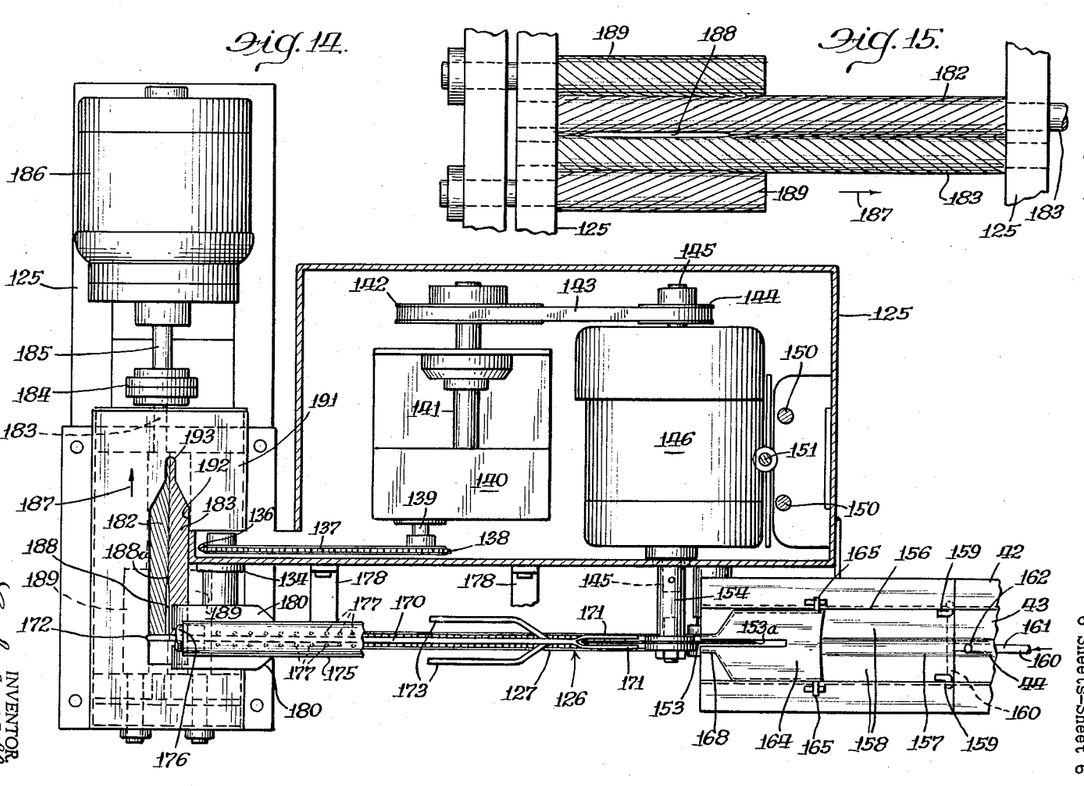
FIGURE 14 is a plan view, partially in section of the embodiment of FIGURE 11.
FIGURE 15 is an enlarged fragmentary plan view of the peeling means of FIGURE 11.

The rotation of knife 153, as indicated at 155, in addition to cutting the stomach, acts to pull the stomach in the direction indicated by arrow 195 in FIGURE 11. This is, of course, the same direction in which the upper run of chain 127 is moving. At about the same time the stomach is frictionally engaged by the chain and by projections 130 thereon. Thee combination of these pulling forces, plus the pushing forces provided by the rearward water jets, move the stomach in the direction indicated by arrow 195. The stomach in turn pulls the gizzard 20 under gate 164. The gate is swung upwardly as the gizzard 20 is pressed against it. However, the gate 164 serves to hold the gizzard down against the bottom walls of feed trough 156. The shape of the feed trough 156, and particularly that of groove 157 (seen in FIGURE 12), in conjunction with the configuration of gate 164, serves to hold the gizzard in the position with the ridge at one side of the gizzard in the bottom of the groove. The presence of the stomach and the pulling on the stomach as it moves into the knife is a further factor in achieving this alignment of the gizzard.

The stomach followed by the gizzard moves along the top run of conveyor 126 and under guide bar 171 and spray head 175. Wings 173 flatten out the two sides of the cut gizzard. Spray head 175, of course, washes out the inner pocket of the gizzard and removes the contents therefrom. As the stomach 21 and gizzard 20 move about the portion of the conveyor defined by sprocket 129, the stomach is lowered into the slot 188 between the two peeling rolls. Tail piece 172 of guide bar 170 and guide plates 180 ensure that the stomach is directed down into the slot. In addition, guide plates 180 ensure that the stomach and gizzard are disengaged from the conveyor 126.

The stomach passes through slot 188. The ribs on the peeling rolls engage the stomach and pull it downwardly. The gizzard is drawn against the top of the peeling rolls. At the same time the two are moved in the direction indicated by arrow 187. When the two reach the end 188a of the slot, the scissors action between the interengaging ribs of the rotating peeling rolls severs the tube 23 at the gizzard. This scissors action is particularly effective by reason of the fact that only one roll, i.e. roll 182, is directly power driven. In effect this roll is rotating ahead of roll 183 and the contact force necessary to in turn drive roll 183 provides the scissors action at the contact between the ribs of thee two rolls. This action is distinctly different than it would be were both of the rolls 182 and 183 directly connected to motor 186. Rolls 182 and 183 drive the respective cleaning rolls 189. To the extent that the grooves between the helical ribs tend to fill up with material as a result of the pulling force on the stomach, these grooves are cleaned out by the interengagement with the cleaning rolls.

The pulling force on the stomach and particularly that applied at the instant that tube 23 is severed, properly positions the cut and clean gizzard on the peeling rolls for effective removal of the lining. As a matter of fact, as the tube is severed at end 188a of the slot, the gizzard is pulled into the interengaging helical ribs of the remaining part of the peeling rolls to effectively commence an engagement of the gizzard lining by the peeling rolls to achieve prompt and effective separation of the lining from the gizzard. The gizzard moves rapidly in the direction indicated by arrow 187. As it commences into the narrowed portion 193 of the opening 192, the gizzard is moved up onto the top of cover plate 191 which supports it against any substantial further contact with the peeling rolls. This configuration of the opening, which in conjunction with the action of the rolls moves the gizzard up onto the cover, prevents the occurrence of the turning over the gizzard on the peeling rolls which has been a problem with prior art devices.

I claim:

1. In the processing of gizzards from poultry using a gizzard processing apparatus, the improvement comprising the steps of: detaching the gizzards from the poultry with portions including the stomachs attached; and using said portions to orient the gizzards in the apparatus.

2. In the processing of gizzards from poultry using a gizzard processing apparatus, the improvement comprising the steps of: detaching the gizzards from the poultry with portions including the stomachs attached; and engaging said portions and moving the gizzards thereby to a predetermined position in the apparatus.

3. In the processing of gizzards from poultry using a gizzard processing apparatus, the improvement comprising the steps of: detaching the gizzards from the poultry with portions including the stomachs attached; moving the stomachs followed by the gizzards toward the apparatus; and engaging said portions and moving the gizzards thereby to a predetermined position in the apparatus.

4. In the processing of gizzards from poultry using a gizzard processing apparatus, the improvement comprising the steps of: detaching the gizzards from the poultry with portions including the stomachs attached; moving the stomachs followed by the gizzards toward the apparatus; engaging said portions and moving the gizzards thereby to a predetermined position in the apparatus; and thereafter detaching the stomachs from the gizzards.

5. In the processing of gizzards from poultry using an apparatus having gizzard engaging means which carry the gizzard past a slitting means, the method of aligning the gizzards with respect to the engaging means including the steps of: detaching the gizzards from the poultry with portions including the stomachs attached; and engaging said portions and moving the gizzard to the engaging means with the tubes connecting the stomachs and the gizzards approximately centered with respect to the engaging means.

6. In the processing of poultry gizzards having portions including the stomachs attached, the improvement comprising the steps of: moving the stomachs followed by the gizzards toward a processing station; and engaging said portions and moving the gizzards thereby to a predetermined position at the processing station.

7. In the processing of poultry using a gizzard processing apparatus having a slitting station and lining removal rollers, the method of removing and cleaning the gizzards comprising the steps of: detaching the gizzards from the poultry with naturally connecting portions attached thereto, leading the gizzards by means of the connecting portions to the slitting station and slitting the gizzards, cleaning the slit gizzards and delivering them to the lining removal rollers, pulling connecting portions and thus the ends of the gizzards to which the connecting portions are attached to engagement with the lining removal rollers and thereafter detaching the connecting portions and removing the linings from the gizzards.

8. In the processing of poultry using a gizzard processing apparatus having a slitting station and lining removal rollers, the method of removing and cleaning the gizzards comprising the steps of: detaching the gizzards from the poultry with naturally connecting portions attached thereto, leading the gizzards by means of the connecting portions to the slitting station and slitting the gizzards, cleaning the slit gizzards and delivering them to the lining removal rollers, and thereafter detaching the connecting portions.

9. In the processing of poultry wherein the gizzards are removed from the poultry with naturally connecting portions attached thereto and wherein the gizzards are slit and cleaned, the improvement comprising: delivering said gizzards to a lining removal station having lining removal rollers with said connecting portions preceding the respective gizzards, pulling the connecting portions and thus the ends of the gizzards to which the connecting portions are attached into engagement with the lining removal rollers, and thereafter detaching the connecting portions and removing the linings from the gizzards.

References Cited in the file of this patent

UNITED STATES PATENTS

| | | |
|---|---|---|
| 2,700,793 | Terry et al. | Feb. 1, 1955 |
| 2,701,386 | Strickler | Feb. 8, 1955 |
| 2,739,345 | Kristmann et al. | Mar. 27, 1956 |
| 2,787,806 | Jett et al. | Apr. 9, 1957 |